United States Patent

Murano

[15] 3,697,944
[45] Oct. 10, 1972

[54] VEHICLE TIRE PRESSURE INDICATING AND SIGNALLING DEVICE

[72] Inventor: Jisaku Murano, 206, Motohongo-cho, Hachiohji-shi, Japan

[22] Filed: Dec. 9, 1969

[21] Appl. No.: 883,514

[30] Foreign Application Priority Data

Dec. 13, 1968 Japan .....................43/91431

[52] U.S. Cl. .....................340/58, 340/224, 338/37, 200/61.25
[51] Int. Cl. .............................................B60c 23/04
[58] Field of Search ...............340/58, 224; 325/117; 200/61.22, 61.25; 338/37; 73/146.4, 146.6

[56] References Cited

UNITED STATES PATENTS

| | | | |
|---|---|---|---|
| 3,281,784 | 10/1966 | Farthing | 340/58 |
| 2,560,852 | 7/1951 | Drane | 340/58 X |
| 1,581,320 | 4/1926 | Pumphrey, Jr. | 340/58 X |
| 2,966,658 | 12/1960 | O'Neill | 340/58 |
| 2,727,221 | 12/1955 | Sprigg | 340/58 |

FOREIGN PATENTS OR APPLICATIONS

478,435   1/1938   Great Britain............73/146.5

*Primary Examiner*—Alvin H. Waring
*Attorney*—McGlew and Toren

[57] ABSTRACT

A tire pressure indicating and signaling device includes a pair of interconnected cylindrical elements, one of which is designed to be screwed directly on to the valve stem of a pneumatic tire and to mount a tire valve communicating with the chamber in this element. The other element encloses variable resistance means and electric contact means which are operative responsive to the pressure in the chamber of the valve stem mounted cylindrical element. The variable resistance means may comprise an iron powder element, a carbon element, or a pressure-sensitive transistor. A signal transmitter is connected to the variable resistance and to the contact means and may be mounted either directly on the tire or adjacent the tire on a fixed portion of the vehicle, such as an axle. When the transmitter is mounted on the tire, it transmits a radio signal to a receiver in the operator'compartment, and this receiver is connected to indicating and alarm means. When the transmitter is mounted on the fixed part of the vehicle, it is connected by conductors to the alarm and indicating means in the driver's compartment.

3 Claims, 5 Drawing Figures

VEHICLE TIRE PRESSURE INDICATING AND SIGNALLING DEVICE

FIELD OF THE INVENTION

This invention relates to tire pressure indicating and signal means and, more particularly, to a novel and improved tire pressure indicating and signaling means including a pressure detector and a signal transmitter mounted on or adjacent a tire and a signal receiver in the operator's compartment of a vehicle and providing audible and visual alarms and indication of the tire pressure.

BACKGROUND OF THE INVENTION

It is already known, that, if the air pressure in pneumatic tires is not sufficient, the tires produce high friction heat between them and the road surface, depending on their construction, at the time of high speed rotation. Eventually, the tires become worn and break down. Therefore, it is indispensable for a driver to always check the tire air pressure from the standpoint of safety traveling.

SUMMARY OF THE INVENTION

The present invention is directed to a device for detecting the air pressure in tires in traveling vehicles moving along the ground or along a track, such as automobiles, monorail cars, or other vehicles, such as airplanes, etc. The tire air pressure is detected in a detecting unit by the action of a pressure-electricity transducer subjected to the tire air pressure. The electric signals produced by this unit are transmitted from the tire to the operator's cabin on the vehicle, by means of a signal transmitting unit. In the operator's cabin, the tire air pressure is indicated electrically on the scale of an indicating unit and, at the same time, signals for safety or danger, alarms, etc, are provided from the unit.

The object of the present invention is to make it possible to always detect the tire air pressure in a driver's cabin and to warn a driver to replenish air by issuing alarms automatically when the air pressure is decreased below the specified value.

The detecting device incorporating the present invention consists of a detecting unit to be mounted on a tire directly, a signal transmitting unit to be installed at the tire side or on the body and an indicating unit to be installed in a driver's cabin. The detecting unit is interconnected with a tire, whose air pressure actuates a contact and a variable resistance element, such as an iron dust element, carbon, pressure sensitive transistor, etc. The air pressure is converted into electric signals which are taken out. The transmitter and receiver or connector of a signal transmitting unit are installed either at the tire side or on the body. The electric signals obtained in the detecting unit are transmitted as a radio wave or over wire to an indicating unit installed in a driver's cabin. The indicating unit has appropriate electric circuits as well as a meter, safety signal lamp, danger signal lamp, alarm buzzer, etc. The indicating unit indicates the tire air pressure on a scale. When the tire air pressure is larger than the specified value, a safety signal lamp is lighted, but if it is smaller than the specified value, a danger signal lamp is lighted and an alarm buzzer is actuated.

As already described, the detecting device of the present invention consisting of a detecting unit, a signal transmitting unit and an indicating unit is designed to indicate the pressure of air in a tire on the indicating unit installed in a driver's cabin and issue safety or danger signal depending on whether the air pressure is larger or smaller than the specified value. Thus, it becomes possible to always maintain the air pressure at an appropriate value and prevent unexpected accidents.

For an understanding of the principles of the invention, reference will be made to the following description of typical embodiments thereof as illustrated in the accompanying drawings.

Figure 1:
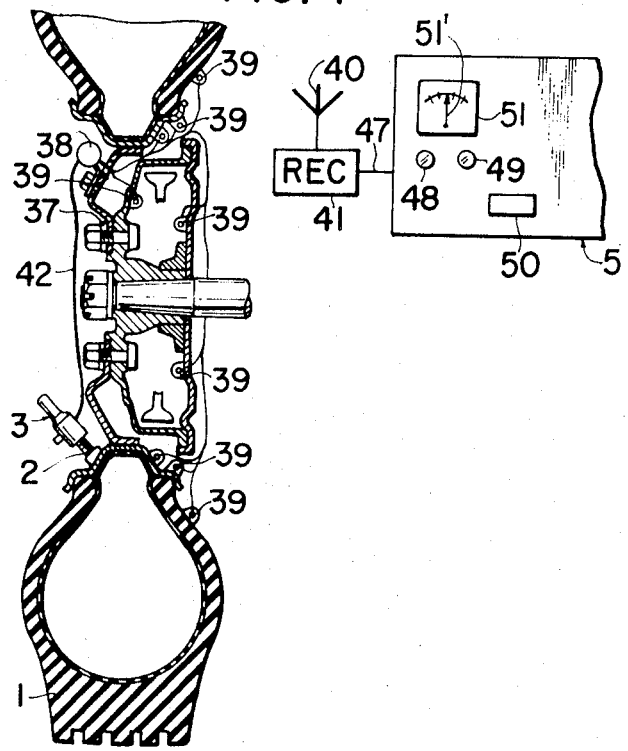
FIG. 1 is a schematic drawing of a detecting device incorporating the present invention with a wheel shown in section, wherein signals are transmitted as a radio wave from a detecting unit mounted on a tire to an indicating unit installed in a driver's cabin.
Figure 2:
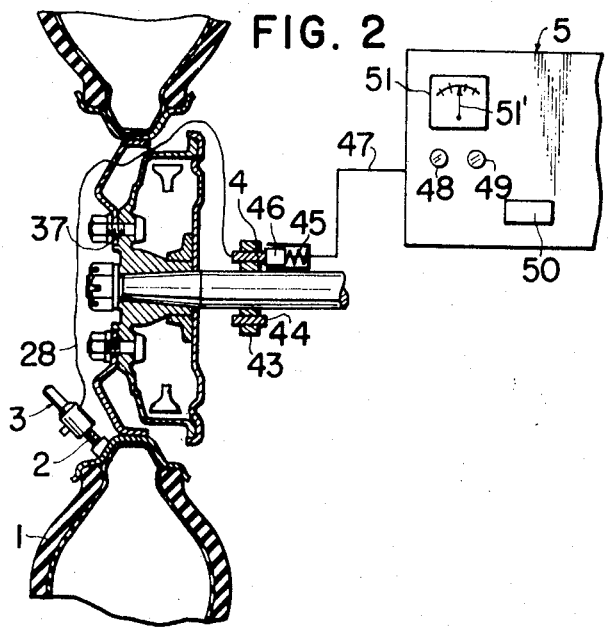
FIG. 2 is a schematic drawing of the second embodiment of the detecting device with a wheel shown in section, wherein signals are transmitted on wire by use of a connector from a detecting unit to an indicating unit.
Figure 3:
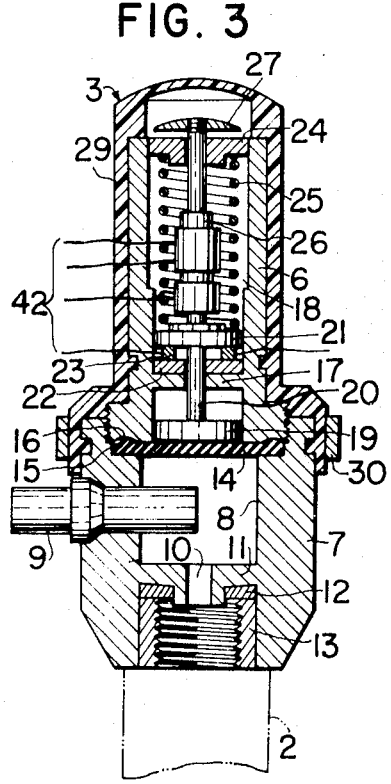
FIG. 3 is an enlarged cross sectional view of a detecting unit wherein an iron dust element is used as a detecting means.
Figure 4:
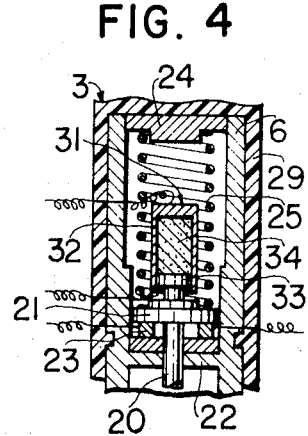
FIG. 4 is a longitudinal cross sectional view of a major portion of the second embodiment of the detecting unit wherein carbon is used as a detecting means.
Figure 5:
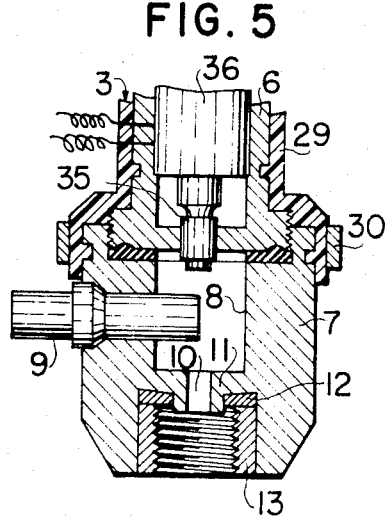
FIG. 5 is a longitudinal cross sectional view of a major portion of the third embodiment of the detecting unit wherein a pressure sensitive transistor is used as a detecting means.

Now referring to FIGS. 1 and 2, a detecting device incorporating the present invention consists of a detecting unit 3 mounted on the valve 2 of a tire 1, a transmitting unit 4 installed on the vehicle along side the tire, and an indicating unit 5 installed in a driver's cabin. The detecting unit 3 has an upper cylinder 6 and a lower cylinder 7, as shown in FIGS. 3, 4 and 5. The lower cylinder 7 forms an air pressure chamber 8 therein, into which an air supply valve 9, for the tire, protrudes or extends. The lower end of chamber 8 is formed with a threaded portion 13 arranged to be screwed onto the valve stem of the tire valve 2, and communicating with chamber 8 through a port 10 in a radially inwardly extending flange 11 which seats a packing 12 arranged to sealingly engage the upper end of the valve stem. Thus, the air pressure in chamber 8 becomes identical with that in the tire. The upper cylinder 6 is screwed to the upper portion of the lower cylinder 7 with the periphery of a diaphragm 14 inserted between them. The diaphragm 14 is sensitively actuated in accordance with the changes in air pressure in air pressure chamber 8. If projections 15 are provided on one side of the diaphragm 14 and grooves 16 are provided at the bottom of either of the cylinder 6 or 7 in positions corresponding to the projections 15, the diaphragm 14 can be firmly secured, and at the same time the cylinders 6 and 7 can be hermetically connected. The upper cylinder 6 forms a hermetic chamber 18 therein with a partition 17 protruding thereinto. Within hermetic chamber 18, a piston 19 is movably placed on the diaphragm 14. A piston rod 20 of piston 19 extends upwardly through an opening in partition 17 and is fixed with the valve body 21. Piston 19, piston rod 20 and valve body 21 act as a unit with diaphragm 14. Beneath valve 21, there is an electric contact 23 secured on partition 17 through the medium of an insulator 22. Valve body 21 is biased to engage contact 23 by a spring 25 whose upper end is engaged with a fixed cover plate 24.

In the embodiment of the invention shown in FIG. 3, the variable resistance element comprises an iron dust element 26. Now, when the amount of air in the tire 1 decreases and the air pressure falls below the specified value, the valve body 21 is brought into contact with the contact 23 and an alarm signal is issued. Reversely, if a sufficient amount of air is charged and the air pressure is increased above the specified value, the valve body 21 is separated upward from the contact 23 and a safety signal is issued. Through the vertical movement of the valve body 21 according to the air pressure, the value of the tire air pressure is converted into electric signals by the iron dust element 26. Since a push element 27 is connected to the valve body 21 through cover plate 24, the signal issuing action can be easily checked by pushing push element 27 with a finger. The portion at which the outer periphery of the upper cylinder 6 is connected to the lower cylinder 7 is covered with a cover 29 made of rubber or synthetic resin and is completely sealed by means of fittings 30, and therefore this unit can operate normally even in water.

In the second embodiment of the detecting unit according to the present invention, a carbon variable resistance element 31 is provided in the upper portion of the valve body 21, as shown in FIG. 4. Carbon element 34 is positioned in a case 32, and pressed by a piston 33 connected to valve body 21. The above-described vertical movement of the valve body 21 causes a variation in the density of a carbon element 34 and consequently the variation in electric resistance, through which the value of the tire air pressure is converted into electric signals.

In the third embodiment of the detecting unit, a pressure sensitive transistor 35 is provided as shown in FIG. 5. This transistor 35 is provided with an appropriate amplification circuit 36 within the upper cylinder 6, and is mounted in the air pressure chamber 8 of the lower cylinder 7 in a position corresponding to the amplification circuit. This transistor serves to directly convert the tire air pressure into electric signals in accordance with the air pressure in the air pressure chamber 8.

A signal transmitting unit 4 shown in FIG. 1 is designed to transmit signals as a radio wave. It consists of a transmitter 38 and sending antennas 39 which are installed at a tire mounting component 37 at the side of a tire, and a receiving antenna 40 and a receiver 41 installed on a vehicle body. The transmitter 38 and sending antennas 39 are connected to the detecting unit 3 by a conductor 42 and they transmit electric signals representing the air pressure as a radio wave.

The second embodiment of the signal transmitting unit 4 is made to transmit signals over a wire by use of a conductor as shown in FIG. 2. Signal transmitting unit 4 comprises a slip ring 44 mounted in an annular insulator 43 in turn mounted on an axle adjacent the mounting 37 for the tire. A conductor 28 connects slip ring 44 to detecting unit 3, and a brush 46 is biased by a spring 45 into contact with ring 44. Brush 46 is connected by a conductor 47 to the unit in the operator's compartment.

As shown in FIG. 1 and 2, an indicating unit 5 houses appropriate electric circuits and is provided with a meter 51, a safety signal lamp 48, a danger signal lamp 49 and an alarm buzzer 50. This unit is connected to the receiver 41 or the contact brush 46 by the conductor 47. Depending on the electric signal received, a needle pointer 51' of the meter 51 indicates the tire air pressure on the meter scale. If the air pressure is satisfactory, the safety lamp 48 is lighted. If the air pressure is in short, the danger signal lamp 49 is lighted, and at the same time the buzzer 50 is actuated.

As described above, the detection device incorporating the present invention converts the air pressure into electric signals in accordance with air pressure by means of the variable resistance element 26 31, or 35 of the detecting unit, transmits the electric signals as a radio wave or on wire by means of the signal transmitting unit from adjacent the tire to the driver's cabin the vehicle body and displays the tire air pressure by means of various indicating points 48, 49, 50 and 51 of the indicating unit. Therefore, the pressure of air in the tire 1 can be always detected. Also, this device has the advantage that an alarm can be issued when the air pressure is suddenly decreased during traveling.

The above description of the present invention is limited to the case of a single tire. In the case of a four-wheeled vehicle, for example, it is necessary to install four devices of this kind. In some cases, it is also advantageous to make it possible to detect the pressure of air in a spare tire.

What is claimed is:

1. In a device for indicating the air pressure in a tire on a movable vehicle, of the type including a pressure-responsive transducer rotatable with the tire and subjected to the tire internal pressure, operable to convert pressure variations into electrical value variations, a pressure indicating means on the vehicle body, and transmission means operable to transmit the electrical value variations to the indicating means, the improvement comprising, in combination, a first cylindrical body defining an air chamber having an open end, arranged to be threaded coaxially on the tire valve stem, and having a port therein communicating with said air chamber and the valve stem interior; a tire inflating valve extending through a wall of said first body and communicating with said first air chamber and the valve stem interior; a second cylindrical body secured in coaxial sealing relation to said first body and having wall means closing said air chamber; a transducer, operable to convert pressure variations into electrical value variations, mounted within said second body and having a pressure-responsive portion included in said wall means and subjected to the pressure in said air chamber; a signal transmitting unit; means electrically connecting said unit to said transducer; said transmitting means transmitting signals from said signal transmitting unit to said indicating means; and a sealing enclosure completely covering the exposed surfaces of said second cylindrical body and its juncture with said first cylindrical body, and sealingly engaged with said first cylindrical body.

2. In a device for indicating the air pressure in a tire, the improvement claimed in claim 1, in which said sealing enclosure has a flexible outer end; and a push element within said second cylindrical body adjacent said flexible outer end and operable, by depression of said flexible outer end, to check said signal transmitting unit.

3. In a device for indicating the air pressure in a tire, the improvement claimed in claim 1, in which said transducer comprises a pressure-sensitive transistor mounted in said wall means and exposed to the pressure in said air chamber, and an amplifier in said second body having its input connected to the output of said transistor.

* * * * *